(12) United States Patent
Kamata et al.

(10) Patent No.: US 7,639,566 B2
(45) Date of Patent: Dec. 29, 2009

(54) GEOPHONE SECUREMENT MECHANISM

(75) Inventors: Masahiro Kamata, Kanagawa-ken (JP);
Colin Wilson, Kanagawa-ken (JP)

(73) Assignee: Schlumberger Technology Corporation, Sugar Land, TX (US)

(*) Notice: Subject to any disclaimer, the term of this patent is extended or adjusted under 35 U.S.C. 154(b) by 0 days.

(21) Appl. No.: 12/053,620

(22) Filed: Mar. 23, 2008

(65) Prior Publication Data
US 2009/0238043 A1    Sep. 24, 2009

(51) Int. Cl.
*H04R 9/00* (2006.01)
(52) U.S. Cl. .................................. 367/183; 367/182
(58) Field of Classification Search ................ 367/182, 367/183, 184
See application file for complete search history.

(56) References Cited

U.S. PATENT DOCUMENTS

| | | | |
|---|---|---|---|
| 3,582,875 A * | 6/1971 | Van Wambeck et al. ...... 367/182 |
| 3,891,050 A | 6/1975 | Kirkpatrick et al. | |
| 4,701,890 A | 10/1987 | Ohmer et al. | |
| 4,893,290 A * | 1/1990 | McNeel et al. ............... 367/178 |
| 5,469,408 A * | 11/1995 | Woo ............................ 367/182 |
| 6,061,302 A | 5/2000 | Brink et al. | |
| 6,173,804 B1 | 1/2001 | Meynier | |
| 6,751,162 B2 | 6/2004 | Dominguez et al. | |

OTHER PUBLICATIONS

"CMG-3T, Triaxial Broadband Seismometer", Operator's guide Part No. MAN-030-0001, Guralp Systems Limited, Jun. 6, 2006.

* cited by examiner

*Primary Examiner*—Ian J Lobo
(74) *Attorney, Agent, or Firm*—Matthias Abrell; Jaime Castano; Dale Gaudier

(57) ABSTRACT

A seismic sensor comprising a coil assembly suspended in a magnet field produced by a magnet assembly, and a locking mechanism for preventing the coil assembly from moving freely until a seismic event is initiated at the surface or within an earth formation to collect seismic data.

18 Claims, 14 Drawing Sheets

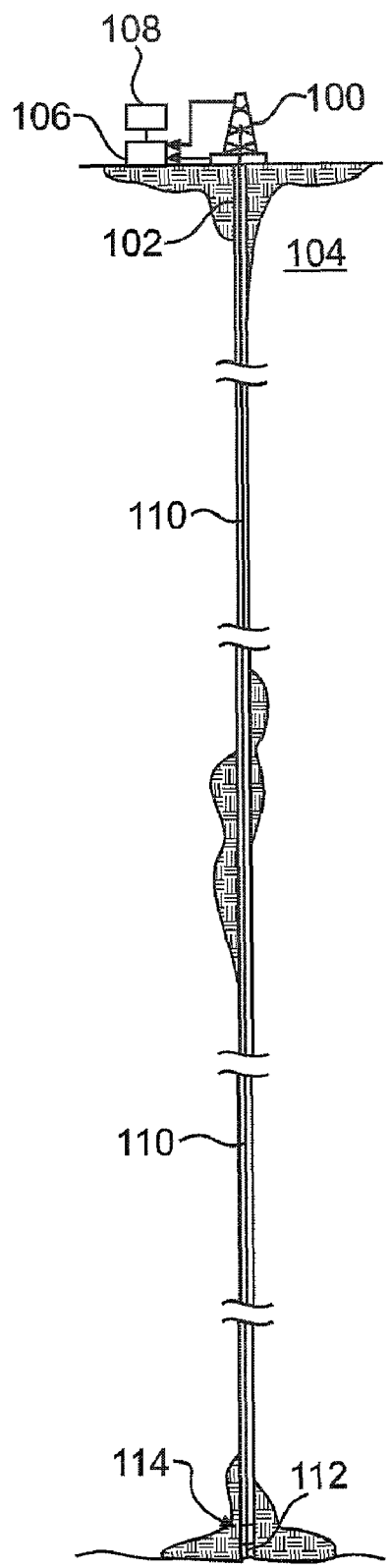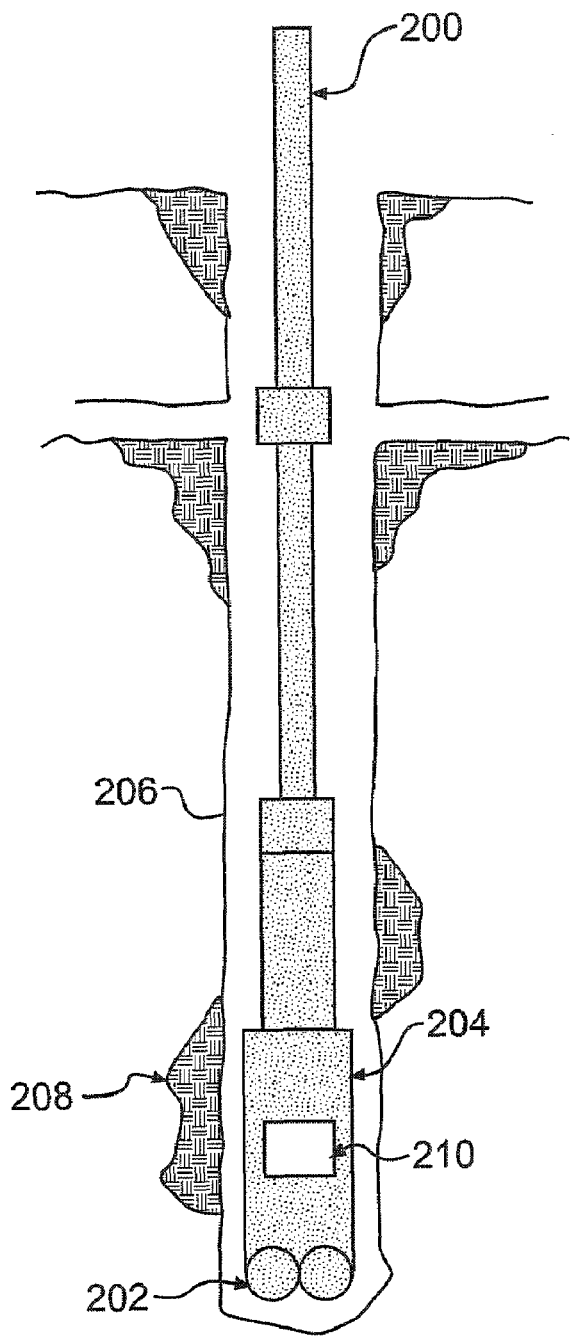
FIG. 1
PRIOR ART
FIG. 2

1600

GEOPHONE SECUREMENT MECHANISM

TECHNICAL FIELD

This invention relates to seismic sensors, and more particularly to seismic sensors, such as geophones and accelerometers, which are designed to withstand seismic survey operations where rough handling can reasonably be anticipated, for example, logging while drilling operations as well as on land seismic applications.

BACKGROUND

In the oil and gas industry seismic tools are deployed downhole and on the surface to provide operationally significant information about borehole and formation attributes adjacent the tools. Borehole seismic data can be utilized to determine subsurface stratigraphy and refine surface seismic data. However, the conditions in which such seismic tools are deployed can be extremely harsh.

More specifically, drilling operations are performed by rotating a drill bit under high normal pressure of 20,000 pounds or so to crush through rock formations. The variable lithology of earth formations and the high pressure and operational temperatures of 150 to 175° C. make the environment adjacent a drill bit and drill collar very rugged and subject to high pressure shocks as the drill bit crushes through formations forming a rugose borehole. Notwithstanding this harsh operating environment it is desirable to make downhole logging while drilling measurements including measurements with relatively delicate seismic equipment such as geophones and accelerometers. Similarly, it is common to use seismic sensors in other rough and harsh operating conditions. The harsh environments however make use of delicate sensors such as geophones and accelerometers problematic.

In seismic data monitoring or collection conventional geophones or accelerometers may be used which include a coil assembly sensitively suspended in a magnetic field produced by a magnet assembly. Vibrations of the earth induced by seismic sources, for example, at the surface of the earth, produce relative motion between the suspended coil assembly and the magnetic field. This motion induces an electrical signal which is proportional to the relative velocity between the coil assembly and the casing of the geophone. When shocks occur due to the normal operation of the seismic tool the centering springs of the geophones can be damaged to an extent that the seismic tool must be retrieved from the borehole to change the geophone.

In the past, a significant amount of borehole and formation data has been acquired by embedding sensors within a drill collar so that logging operations can be performed concurrently with drilling. Although it would be desirable to supplement the large amount of data already acquired by direct measurement of seismic waves with a geophone in the past such delicate instruments have been unable to survive the harsh environment for a practical length of time.

The limitations of conventional seismic sensor designs for operation in environments noted in the preceding are not intended to be exhaustive but rather are among many which may tend to reduce the effectiveness of previously known sensor mechanisms in field operation. The above should be sufficient, however, to demonstrate that sensor structures existing in the past will admit to worthwhile improvement for harsh shock applications.

SUMMARY

Embodiments disclosed herein provide a geophone or an accelerometer including a locking mechanism for selectively preventing a coil assembly from inadvertent movement and damage. In certain embodiments herein, the locking mechanism may be actuated by one or more of fluidic or electromagnetic or piezoelectric action.

One embodiment herein comprises a geophone with a first fluid bladder (which fluid can be a gas or liquid) and a second fluid bladder formed on an inner surface of a top end cap and a bottom end cap of the geophone, respectively. The first and second fluid bladders are connected to a source assembly. When inflated, the first bladder and the second bladder abut against the springs supported coil assembly of the geophone to prevent a coil assembly of the geophone from moving freely.

Another embodiment comprises a three-component geophone, each of which is a geophone similar in structure to the geophone described above. The fluid bladders in each of the three geophones are connected to a common fluid source assembly. When inflated, the bladders in each of the three geophones abut against springs of the geophones to prevent coil assemblies of the geophones from moving freely.

Another embodiment herein comprises a geophone with a tubular magnet mounted on an inner surface of a side wall of the geophone, a bobbin positioned inside the tubular magnet which is resiliently mounted to the side wall by means of springs, at least one coil mounted around the bobbin, and a first damper mechanism and a second damper mechanism mounted on the center region of the inner surfaces of the top end cap and the bottom end cap of the geophone, respectively. When the damper mechanisms are turned on, damper plates of the damper mechanisms abut against a top end and a bottom end of the bobbin, respectively.

Another embodiment of the subject invention comprises a geophone including a central pole piece connected to a top end cap and a bottom end cap of the geophone, wherein a locking mechanism is located inside the central pole piece.

In aspects disclosed herein, a seismic sensor comprises a housing; at least one magnet mounted within the housing; a coil assembly mounted within the housing; at least one spring assembly connected to the housing and the coil assembly for supporting the coil assembly for transduction within the magnet; and a locking mechanism for preventing the coil assembly from moving when the sensor is in an OFF status. The locking mechanism may be configured for activation by fluidic action. The fluid activated locking mechanism may comprise at least one fluid bladder and a fluid source assembly. The housing may be configured for positioning within a borehole or may be configured for positioning at the surface. In aspects herein, the locking mechanism may comprise a rotatable locking disc.

In other aspects of the present disclosure, a geophone for detecting seismic events in a downhole logging while drilling environment comprises a housing operable to be positioned within a borehole; at least one permanent magnet for creating a magnetic field mounted within the housing; a coil assembly mounted within the housing; at least one spring assembly connected to the housing and the coil assembly for supporting the coil assembly for transduction within the magnetic field; and a fluid activated locking mechanism for preventing the coil assembly from moving when the geophone is in an OFF status. The fluid locking mechanism may comprise at least one damper plate operable to abut the coil assembly.

In yet other aspects herein, a geophone for detecting seismic events in a downhole logging while drilling environment may comprise a housing having a first end cap and a second end cap operable to be positioned within a borehole; a pole piece connected to the first end cap and the second end cap; at least one permanent magnet for creating a magnetic field mounted within the housing; a coil assembly mounted within the housing; at least one spring assembly connected to the housing and the coil assembly for supporting the coil assembly for transduction within the magnetic field; and a locking mechanism for preventing the coil assembly from moving when the geophone is in an OFF status, wherein the locking mechanism is configured for activation by one or more of fluidic, electro-magnetic and piezoelectric action. In aspects disclosed herein, the locking mechanism may be located inside the pole piece and the locking mechanism may comprise a solenoid.

A three-component geophone for detecting seismic events in a downhole logging while drilling environment comprises a first geophone, a second geophone, and a third geophone oriented along three mutually orthogonal axes; a housing containing the first geophone, second geophone, and third geophone; wherein each of the first geophone, second geophone and third geophone comprises a housing; at least one permanent magnet for creating a magnetic field mounted within the housing; a coil assembly mounted within the housing; at least one spring assembly connected to the housing and the coil assembly for supporting the coil assembly for transduction within the magnetic field; and a locking mechanism for preventing the coil assembly from moving when the sensor is in an OFF status, wherein the locking mechanism may be configured for activation by fluidic action, the fluid activated locking mechanism comprising a fluid source assembly connected to the housing containing the first geophone, second geophone and third geophone; and at least one fluid bladder. In aspects herein, the fluid activated locking mechanism may comprise at least one locking disc actuated by the fluid bladder. In other aspects herein, the fluid activated locking mechanism may comprise at least one diaphragm with a corrugated surface. In yet other aspects, the fluid activated locking mechanism may comprise at least one bellows. The fluid activated locking mechanism may comprise a liquid and/or a gas.

THE DRAWINGS

Other aspects of the present disclosure will become apparent from the following detailed description of embodiments thereof taken in conjunction with the accompanying drawings wherein:

FIG. 1 is a schematic view of a typical derrick and a logging-while-drilling (LWD) system where a drill string is positioned within a borehole and a well logging segment near a drill bit is shown within a borehole;

FIG. 2 is a more detailed view of the distal end of a drill string including a drill collar with a geophone, seismic package embedded within a portion of the thick walled drill collar;

Figure 10A:
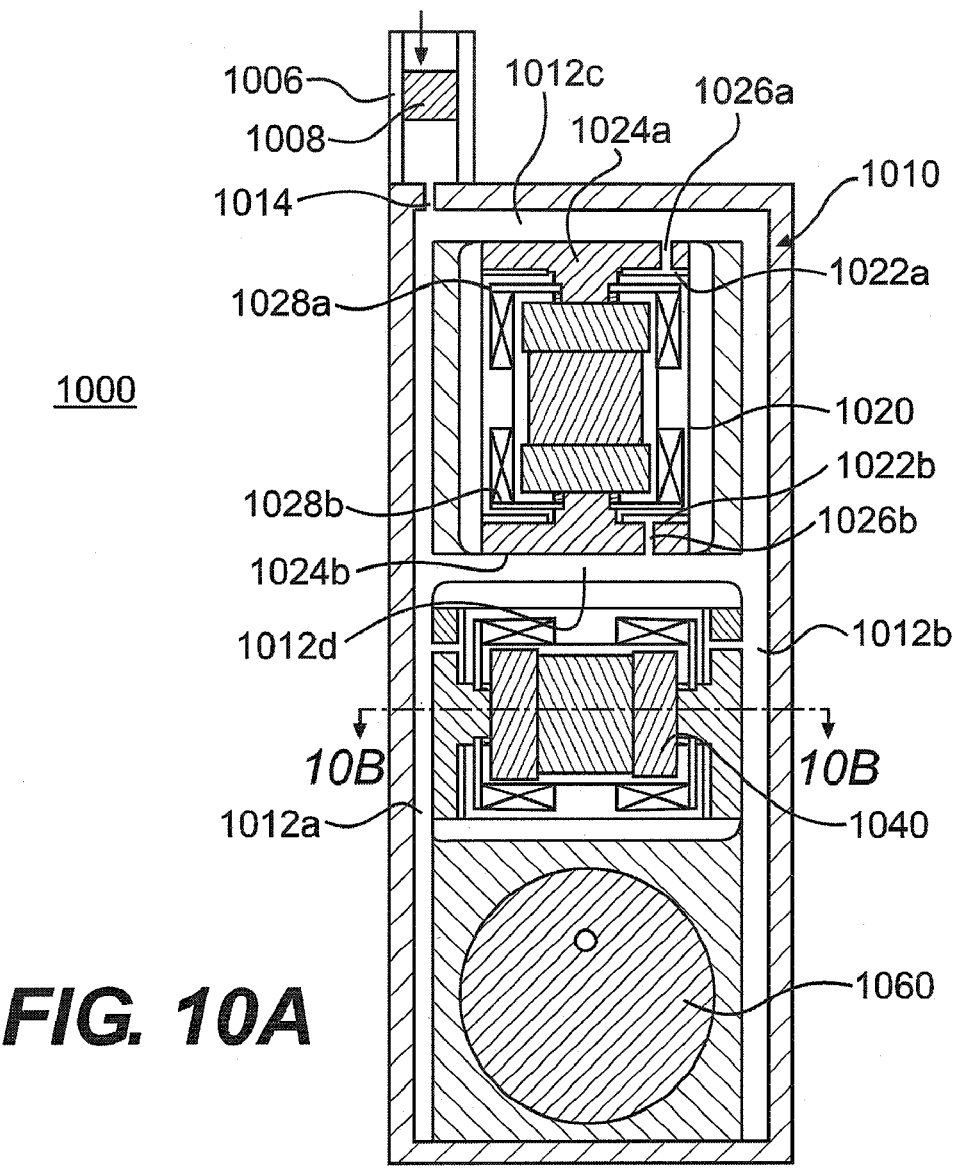
Figure 10B:
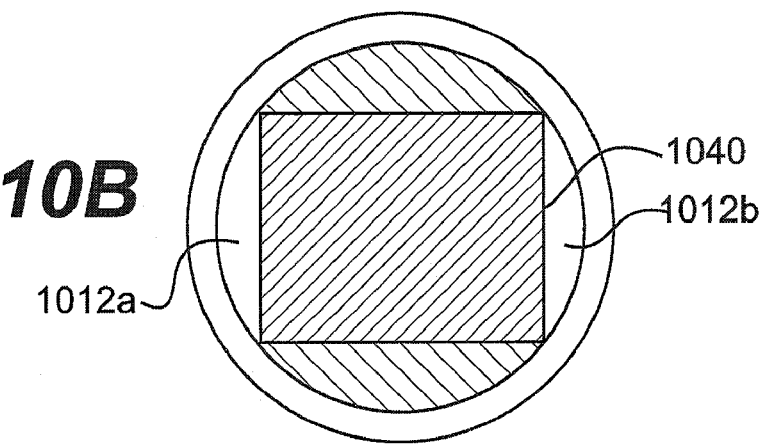
Figure 11:
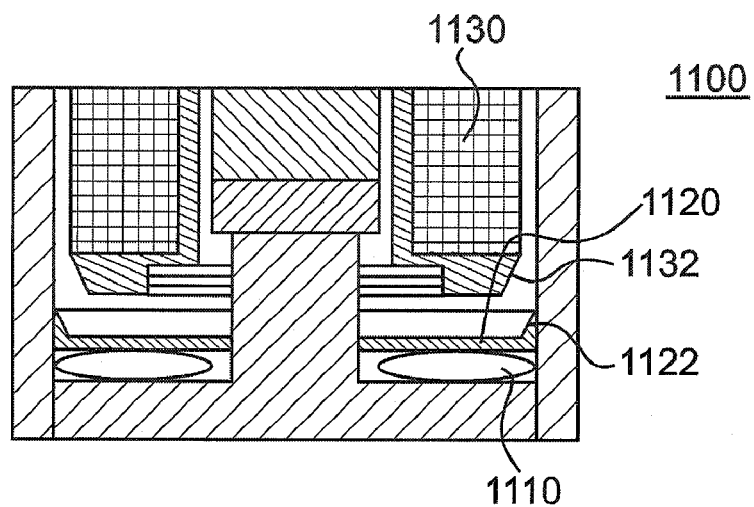
Figure 12A:
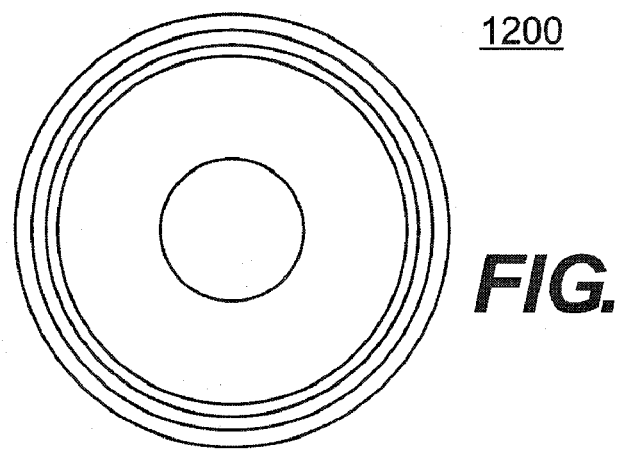
Figure 12B:
Figure 13A:
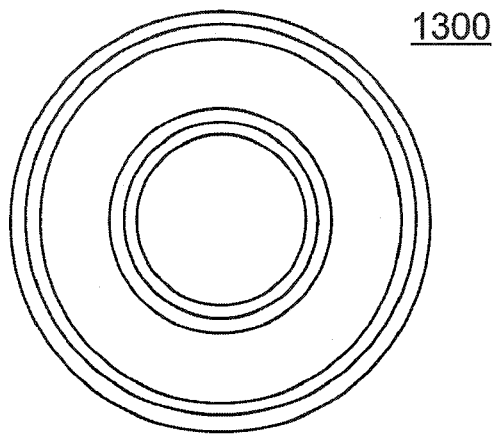
Figure 13B:
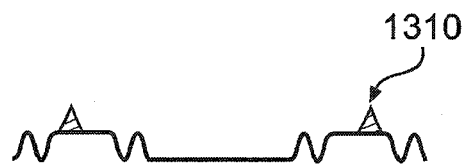
Figure 13C:
Figure 14:
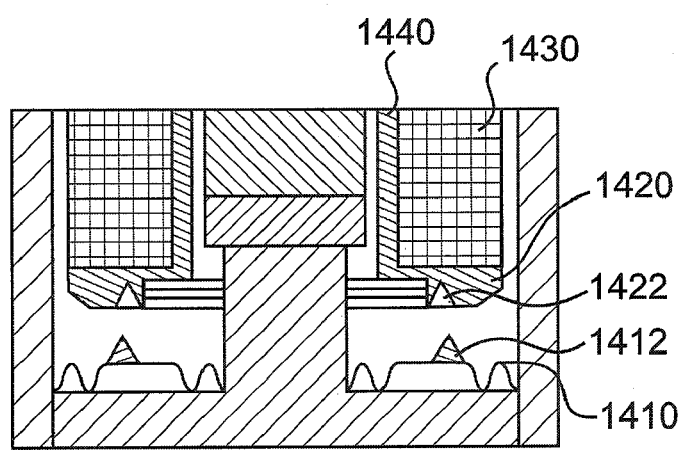
Figure 15A:
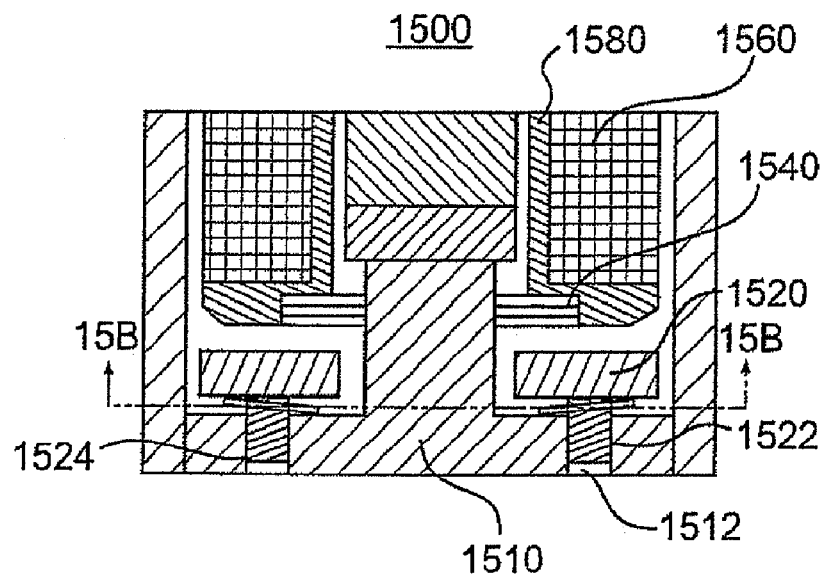
Figure 15B:
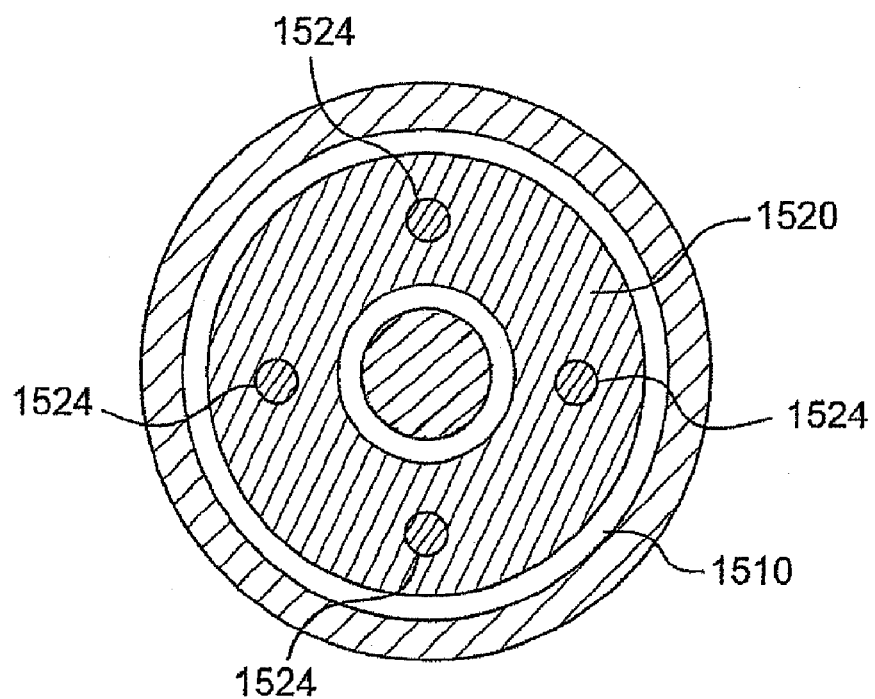
Figure 16A:
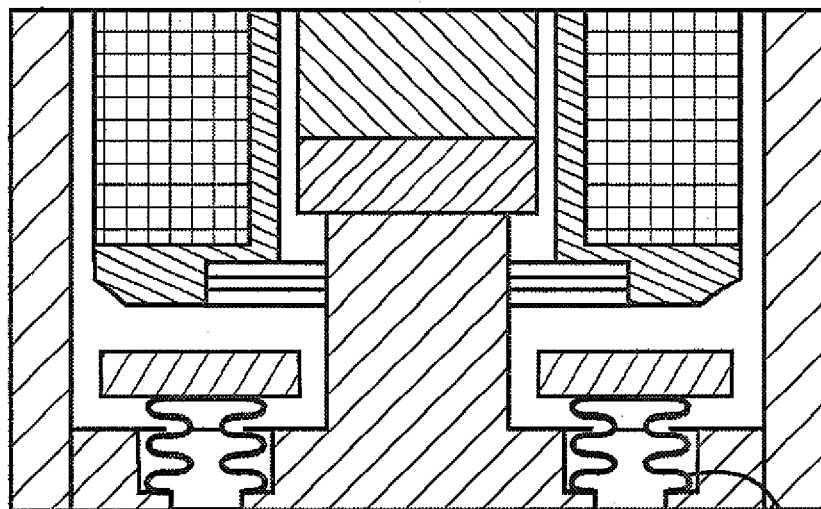
Figure 16B:
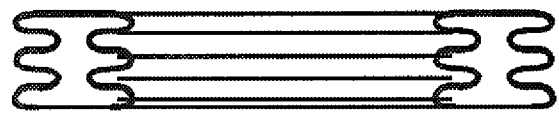
Figure 17A:
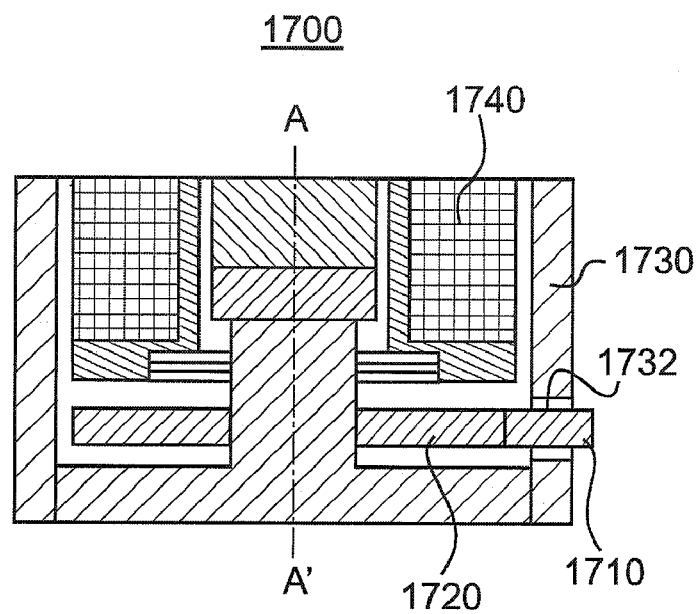
Figure 17B:
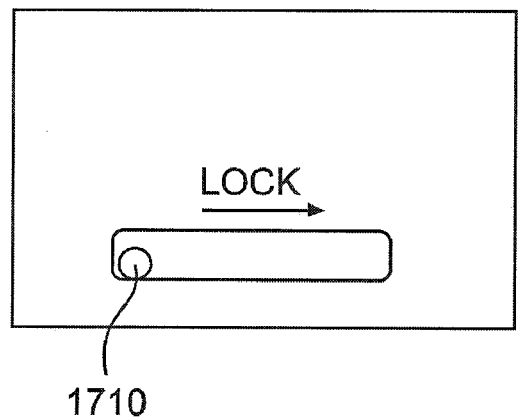
Figure 17C:
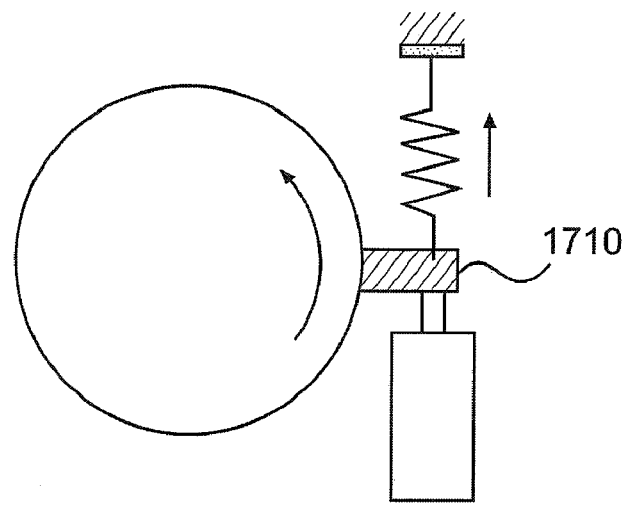

FIGS. 10A and 10B disclose another embodiment of the present disclosure including an internal channel for a fluid actuation mechanism;

FIG. 11 discloses a locking mechanism and securement assembly to prevent both translation and rotation of a suspended assembly;

FIGS. 12A and 12B disclose one embodiment of a diaphragm used to form a bladder locking mechanism of a geophone according to one embodiment of the present disclosure;

FIGS. 13A, 13B and 13C disclose additional embodiments of diaphragms according to the disclosure herein;

FIG. 14 is a partial cross-sectional view of a geophone disclosing engagement of a rotation and translation locking system in accordance with one embodiment of the present disclosure;

FIGS. 15A and 15B disclose views of a mechanical securement assembly in accordance with the subject disclosure;

FIGS. 16A and 16B disclose yet another embodiment of a locking mechanism in accordance with the present disclosure; and FIGS. 17A, 17B and 17C disclose yet further views of a mechanical locking mechanism in accordance with the embodiments disclosed herein.

DETAILED DESCRIPTION

Turning now to the drawings, wherein like numerals indicate like parts, the disclosure herein is directed to the concept of shock resistant seismic sensors such as surface and downhole seismic sensors designed for high shock environments. For example, the seismic sensors disclosed herein may be logging-while-drilling geophones and accelerometers, which include internal selective locking mechanisms operable for a harsh downhole drilling collar environment. In other aspects according to the present disclosure, the seismic sensors may be utilized for moving checkshots as described in co-pending, commonly owned, U.S. patent application Ser. No. 11/681,788, titled "Methods and Apparatus for Performing Moving Checkshots." In yet other aspects, the seismic sensors may be surface implanted sensors for purposes of seismic surveying.

FIG. 1 discloses a drilling derrick 100 positioned over a well or borehole 102 being drilled into an earth formation 104. The drilling derrick has the usual accompaniment of drilling equipment including a processor 106 and recorder 108 of the type used for measurements-while-drilling (MWD) or logging-while-drilling (LWD) operations. A more detailed disclosure of conventional drilling equipment of the type envisioned here is described in Schlumberger's Wu et al. published U.S. Patent Application No. 2006/0120217, the disclosure of which is incorporated herein by reference as though set forth at length.

The borehole 102 is formed by a drill string 110 carrying a drill bit 112 at its distal end 114. The drill bit crushes its way through earth formations as the drill string is rotated by drilling equipment within the drilling derrick or a hydraulic motor positioned at the distal end of the drill string or bottom hole assembly. The depth of a well to a desired production zone will vary but may be as much at 25,000 feet or more beneath the surface of the earth. Operational pressures of 20,000 pounds and temperatures of 150 to 175° C. are often encountered. Moreover, the varying lithology of rock formations makes shocks to a drill collar during a drilling operation not unusual. Unintended shocks can, however, severely damage or even break the delicate suspension springs of the geophones or accelerometers.

FIG. 2 discloses a more detailed view of the distal end of a drill string 200. In this the drill string terminates with a drill bit 202 which is screwed into a drill collar 204. The drill collar has a relatively thick side wall of two to four inches and is extremely heavy to provide weight for the drill bit as it is rotated to crush a borehole 206 through surrounding formation rock 208 into the earth.

FIG. 2 also discloses a receiving structure 210 that is cut into the sidewall of the drill collar 204 and serves to receive a seismic sensing assembly of the types discussed below.

Figure 3:
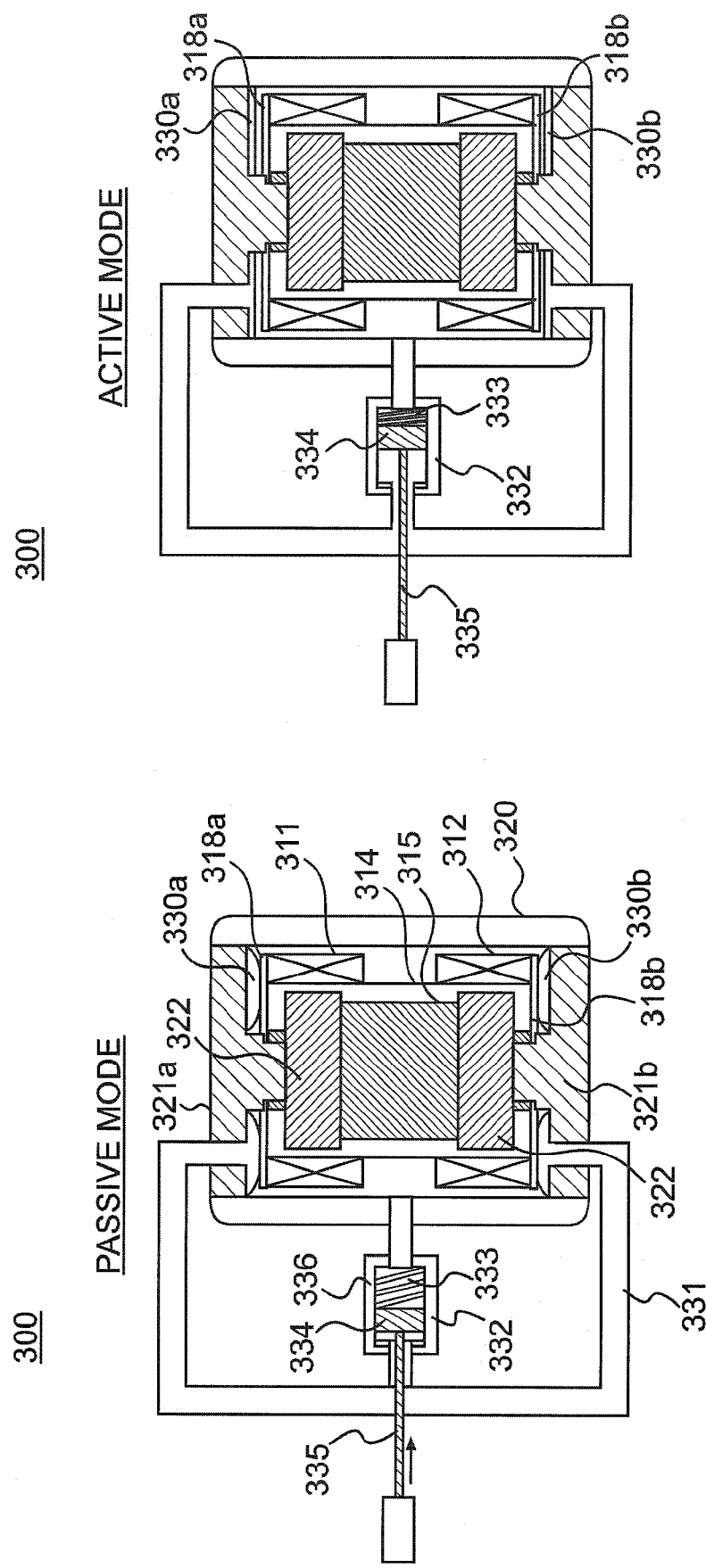
FIGS. 3A and 3B show a schematic view of a geophone according to one embodiment disclosed herein.

FIGS. 3A and 3B illustrate a geophone according to one embodiment herein. The geophone comprises moving coils 311 and 312 mounted on a bobbin 314, a magnet 315, a pole piece 322, springs 318a and 318b, and a housing 320. The magnet may be a permanent magnet, an electromagnet, or other types of magnets know in the art. The springs 318a and 318b may be disc springs, spider springs, or other spring configurations where appropriate. Two fluid bladders 330a and 330b are mounted on the inner surfaces of two end caps 321a and 321b around pole piece 322 of the geophone such that when inflated, the two fluid bladders 330a and 330b will abut against the springs 318a and 318b, respectively. A pipe 331 has an end penetrating through the top end cap 321a to connect to the fluid bladder 330a, and the other end penetrating through the bottom end cap 321b to connect to the bladder 330b. The pipe 331 is further connected to a fluid source assembly 332. The fluid source assembly 332 includes a sleeve 336, which accommodates a spring 333, a piston 334, and a rod 335 formed with the piston 334. The rod 335 may be connected to a suitable actuator to drive the piston 334. In this, any suitable fluidic, mechanical, electromagnetic, or piezoelectric actuator may be employed for purposes of the locking mechanism as described hereinafter. For example, a solenoid (not shown) may be used to provide active force to the rod 335 and the piston 334 to compress the spring 333.

As shown in FIG. 3A, when the geophone is in a passive mode, namely, not in use, the spring 333 of the fluid source assembly is in an extended condition. Fluid within the pipe 331 is thus compressed. The fluid bladders 330a and 330b are then inflated and abut against the springs 318a and 318b, respectively, and prevent the coil assembly, which includes the springs 318a and 318b, and the bobbin 314, from moving freely.

FIG. 3B shows a geophone in an active mode, namely, in operation, according to an embodiment of the present disclosure. When a solenoid, for example, is turned on, the solenoid drives the piston 334 through the rod 335 to compress the spring 333. Fluid within the pipe 331 flows into the space in the fluid source assembly 332, which leads to a decrease in the fluid pressure in the pipe 331. The fluid bladders 330a and 330b are then deflated and release the coil assembly. The fluid within the pipe 331 may be filled with air, nitrogen, oil, water, alcohol, hydraulic fluid, or other fluids depending upon the specific application.

Figure 4:
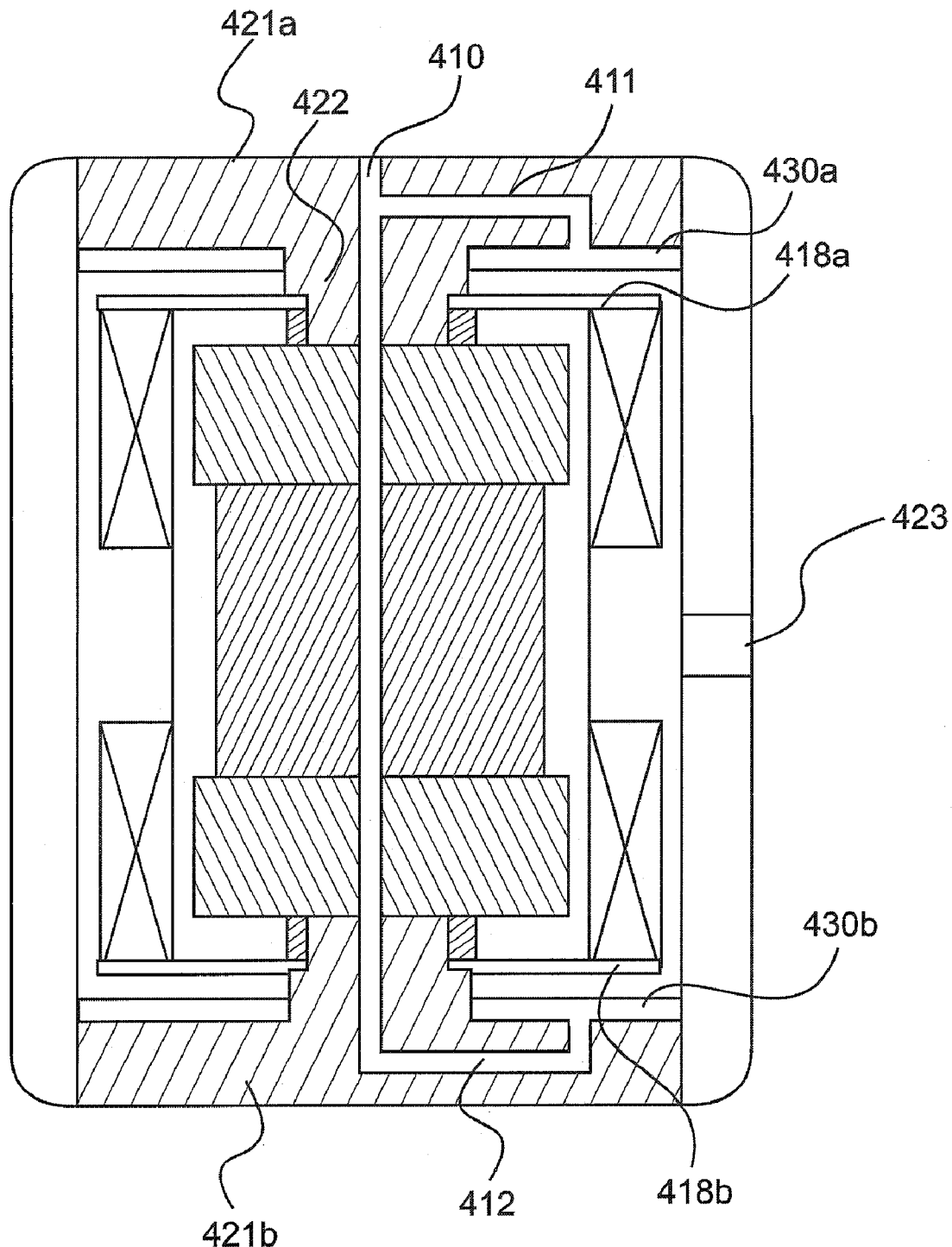
FIG. 4 shows a geophone according to another embodiment disclosed herein.

FIG. 4 illustrates a geophone 400 according to another embodiment of the present disclosure. Similar to the geophone 300 shown in FIGS. 3A and 3B, the geophone 400 includes two annular torus shaped, fluid bladders 430a and 430b mounted on the respective inner surfaces of two end caps 421a and 421b and around pole piece 422 of the geophone. When the two fluid bladders are inflated, the two fluid bladders 430a and 430b will abut against the springs 418a and 418b, respectively. A port 423 is formed on the housing of the geophone 400 for providing a fluid channel between the inside and the outside of the geophone. A fluid passage 410 is formed inside the pole piece 422. The fluid passage 410 has a first branch 411, which is formed inside first end cap 421a and connected to the first fluid bladder 430a. The fluid passage has a second branch 412, which is formed inside the second end cap 421b and is connected to the second fluid bladder 430b.

The fluid passage 410 is connected to a fluid source assembly (not shown) which supplies fluid pressure to the two toric fluid bladders or releases fluid from the two fluid bladders through the fluid passage 410. When the geophone is in an OFF status, fluid pressure will be supplied to the two fluid bladders 430a and 430b through the fluid passage 410. The two fluid bladders are thus inflated to abut against the springs 418a and 418b, respectively. When the geophone is in operation, the fluid in the two fluid bladders 430a and 430b will be released by the fluid source assembly and the two fluid bladders will deflated to release the springs 418a and 418b.

Figure 5:
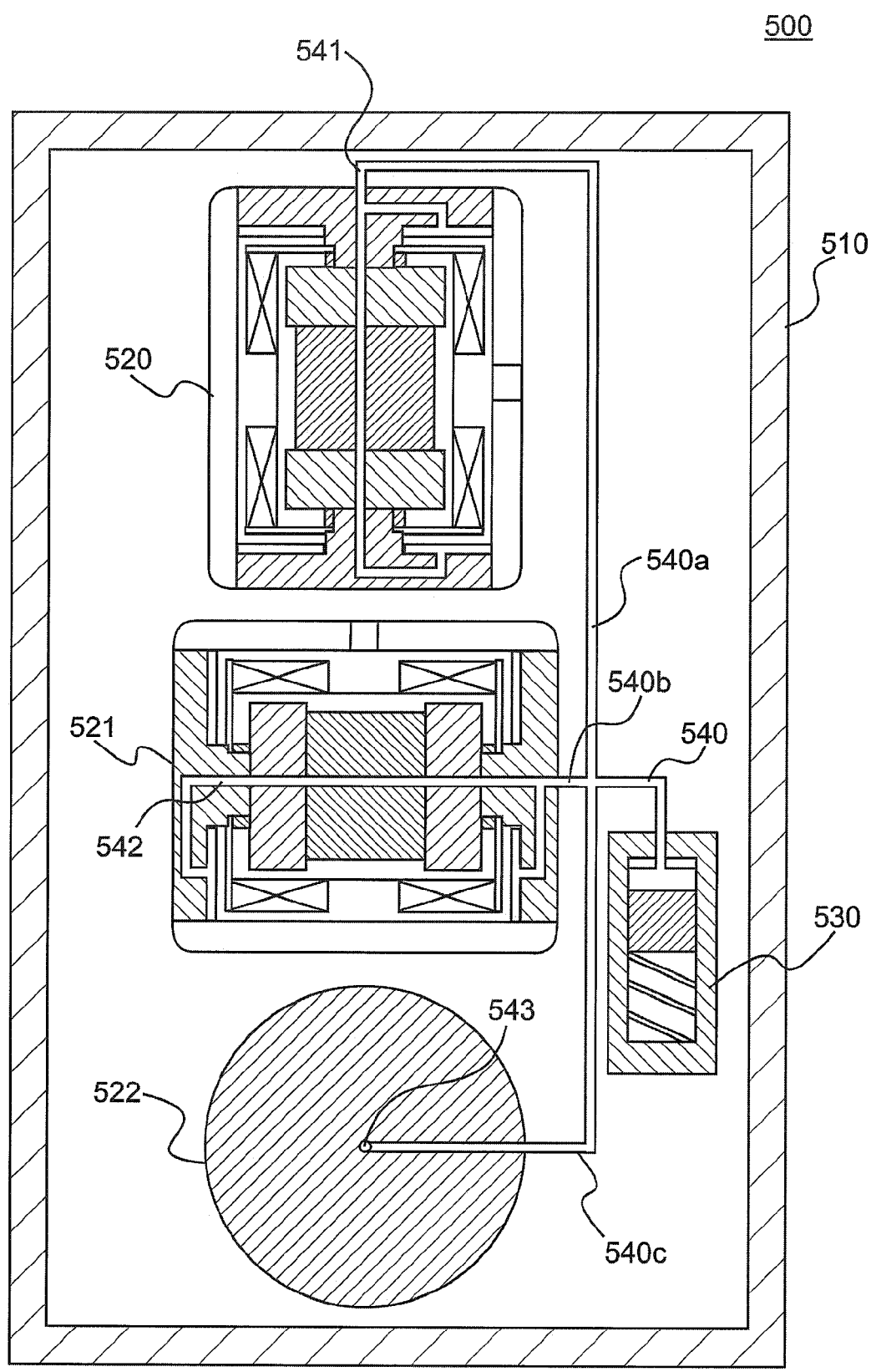
FIG. 5 shows a schematic view of a three-component geophone to detect seismic events as they impact a three dimensional coordinate system.

FIG. 5 illustrates a three-component geophone 500 according to another embodiment of the present disclosure. The three-component geophone 500 includes a housing 510 containing a first geophone 520, a second geophone 521, and a third geophone 522. The three geophones 520, 521 and 522 are oriented along the orthogonal axes of a three-dimensional rectangular coordinate system. Each geophone has the same structure as the geophone 400 as shown in FIG. 4. Each geophone has a fluid passage 541, 542, and 543, respectively. A fluid source assembly 530 supplies fluid to or releases fluid from the fluid bladders of the three geophones through a pipe 540, which has three branches 540a, 540b and 540c connected to fluid passages 541, 542, and 543 of the geophones, respectively. When the three-component geophone is in an OFF status, fluid pressure will be supplied to the fluid bladders of each geophone 520, 521, 522 through the pipe 540. The fluid bladders of each geophone are thus inflated to abut against the springs of each geophone. When the three-component geophone is in operation, fluid within the fluid bladders of each geophone will be released by the fluid source assembly and the fluid bladders are deflated to thereby release the springs of each geophone.

Figure 6:
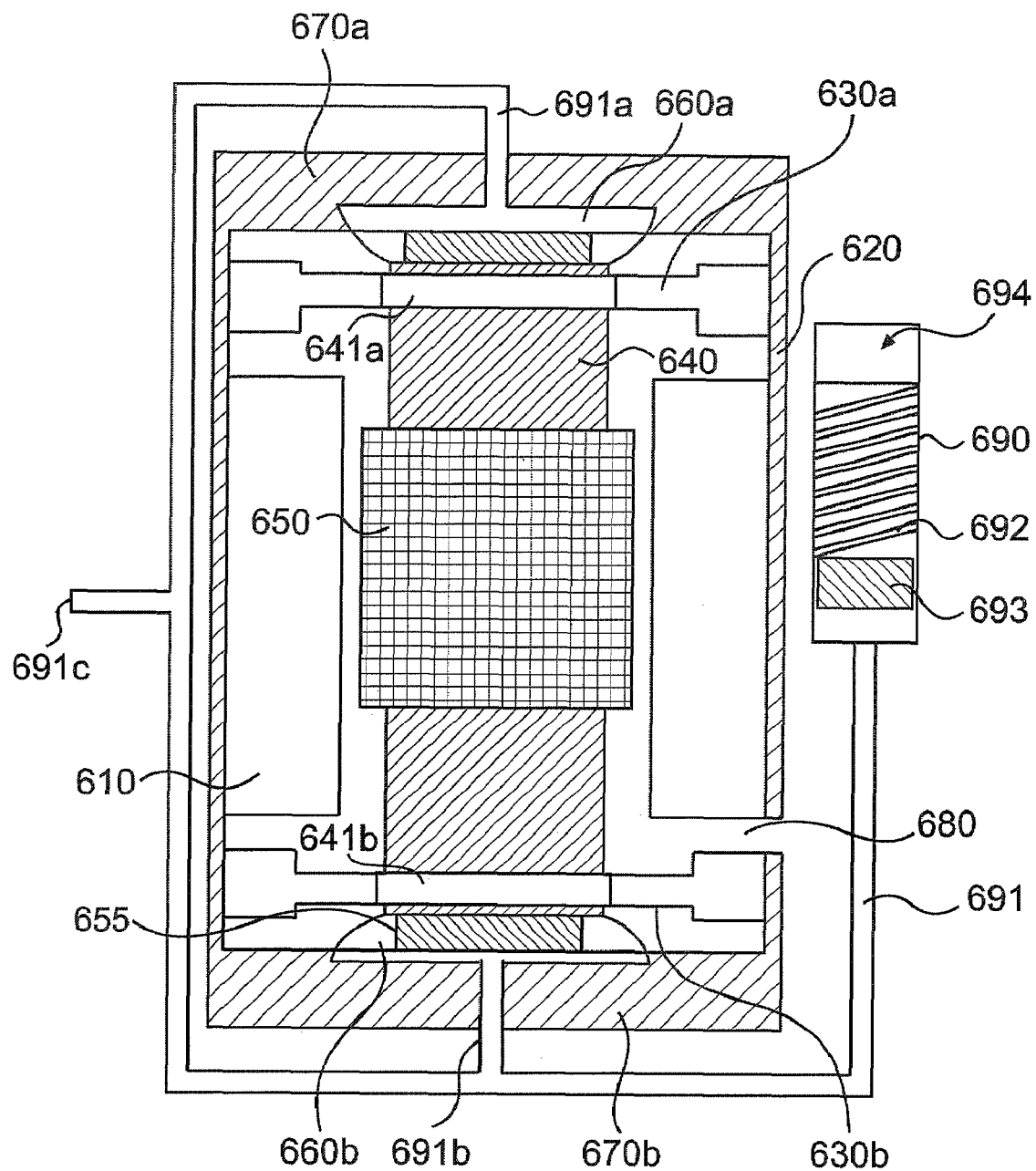
FIG. 6 shows a schematic view of a geophone according to another embodiment disclosed herein.

FIG. 6 illustrates a geophone 600 according to another embodiment. The geophone 600 comprises a tubular magnet 610 fixed to the inside of housing 620. The tubular magnet 610 may be formed from a number of discrete pieces or a single piece magnet may be used. A tubular bobbin 640 is positioned inside the tubular magnet 610 and is secured to the housing of the geophone by means of springs 630a and 630b. The springs 630a and 630b allow the bobbin 640 to translate in an axial direction but hold it relatively securely in the radial direction. The springs 630a and 630b may be circular springs, or other types of springs where appropriate. A pole piece 655 is provided inside the tubular bobbin 640.

A coil 650 is wound around the outer surface of the bobbin 640 and so is likewise moveable relative to the magnet 610. Two fluid bladders 660a and 660b are formed around the pole piece 655 on the center region of the inside surfaces of two end caps 670a and 670b of the geophone. A hole 680 may be formed on the housing 620 of the geophone to allow fluid to flow between the inside and outside of the geophone. A pipe 691 has a branch 691a penetrating through the top end cap 670a and connects into the fluid bladder 660a, and has another branch 691b that penetrates through the bottom end cap 670b and connects into the fluid bladder 660b. The pipe 691 may have a third branch 691c to connect to other geophones.

The pipe 691 has one end connected to a fluid source assembly 690, which comprises a spring 692, a piston 693, and a piston drive unit 694. The fluid source assembly 690 supplies fluid to or releases fluid from the fluid bladders 660a and 660b through the pipe 691. When the geophone is in OFF status, the spring 692 is in a released status and the fluid pressure inside the pipe is higher than the fluid pressure inside the geophone. Due to the fluid pressure difference, the fluid bladders 660a and 660b are inflated and abut against the top end 641a and the bottom end 641b of the bobbin 640, respectively, and thus prevent the coil assembly, which includes springs 630a and 630b, and tubular bobbin 640, from moving axially. When the geophone is in operation, the fluid source assembly 690 is turned on and the piston drive unit 694 retracts the piston 693. The fluid within the pipe 691 flows into the space in the fluid source assembly 690, which leads to a decrease in the fluid pressure in the pipe 691. The fluid bladders 660a and 660b are thus deflated and release the springs 630a and 630b.

Figure 7:
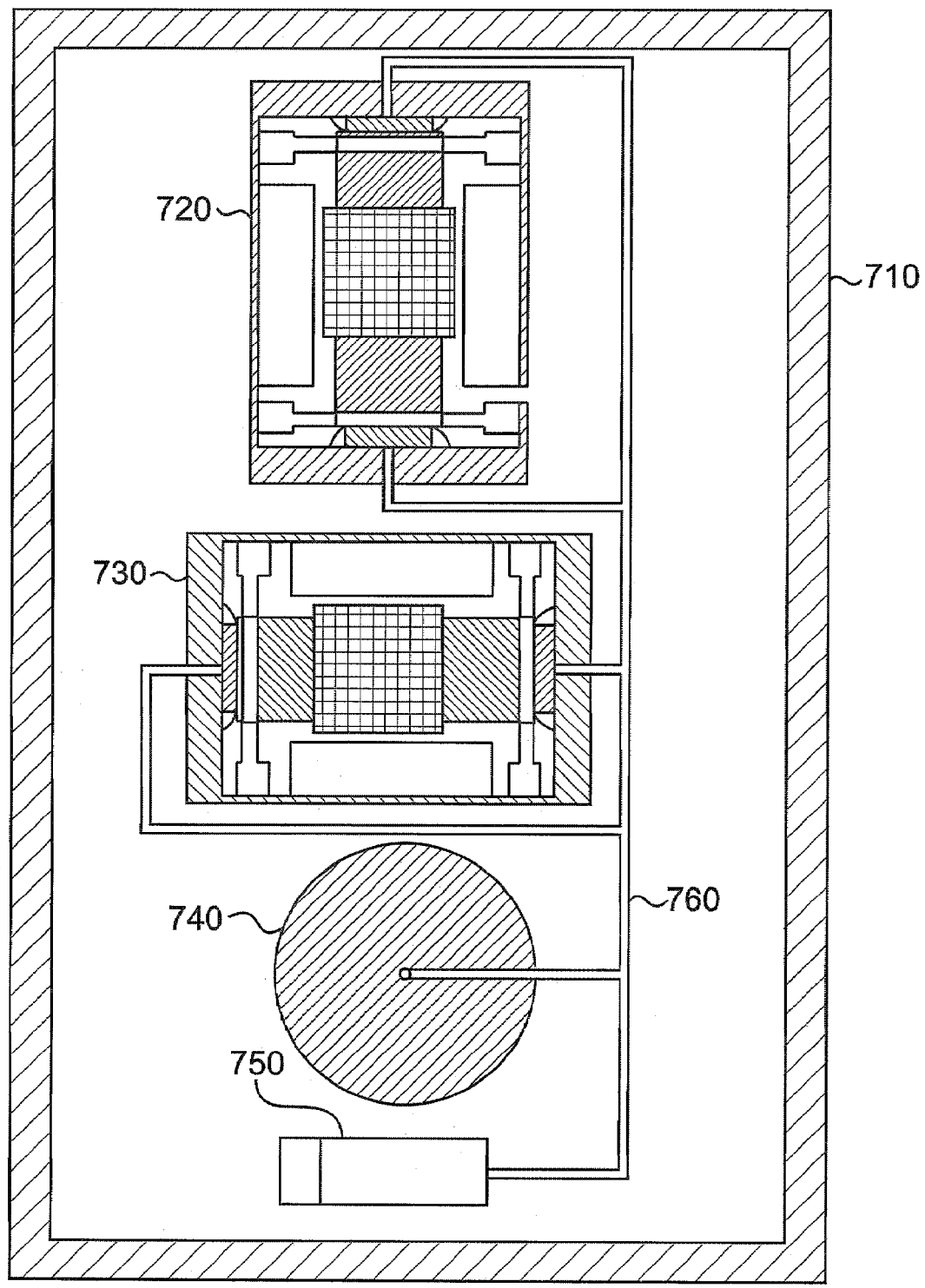
FIG. 7 shows a schematic view of a three-component geophone utilizing individual geophones as depicted in FIG. 6.

FIG. 7 illustrates a three-component geophone system according to another embodiment of the present disclosure. The three-component geophone system includes a housing 710 containing a first geophone 720, a second geophone 730, and a third geophone 740. The three geophones 720, 730 and 740 are oriented along the three orthogonal axes x, y, and z of a three-dimensional rectangular coordinate system. Each geophone has a structure and operation similar to that of the geophone 600 as shown in FIG. 6. Unlike geophone 600, however, geophones 720, 730 and 740 have only one common fluid source assembly 750.

Each geophone has two fluid bladders connected to the fluid source assembly 750 through a common pipe 760. When the three-component geophone is in an OFF status, fluid pressure will be supplied to the fluid bladders of each geophone 720, 730 and 740 through the pipe 760. The fluid bladders of each geophone are thus inflated to abut against the centering springs of each geophone. When the three-component geophone is in operation, the fluid in the fluid bladders of each geophone will be released by the fluid source assembly 750 and the fluid bladders are thus deflated to thereby release the springs of each geophone.

Figure 8B:
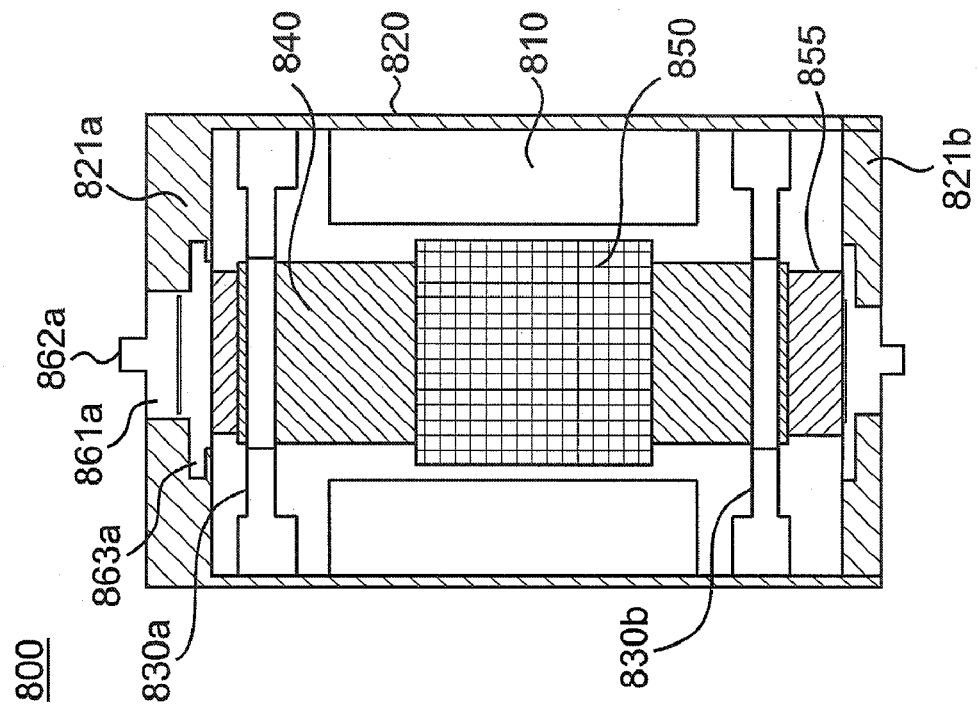
FIGS. 8A and 8B show a schematic view of a geophone according to yet another embodiment disclosed herein.
Figure 8A:
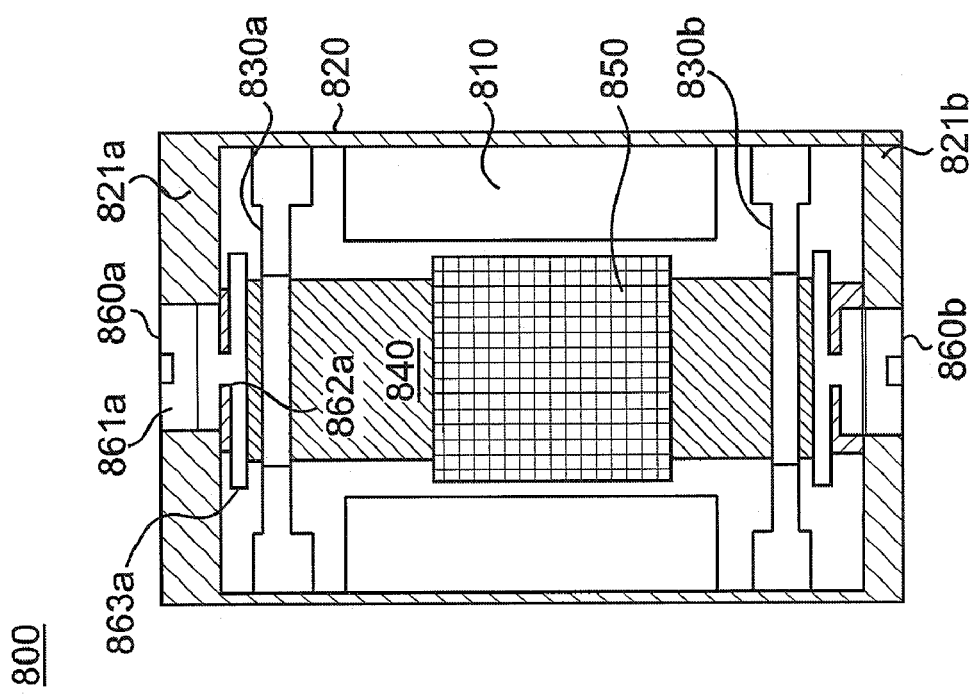

FIGS. 8A and 8B illustrate a geophone according to yet another embodiment. The geophone 800 comprises a tubular magnet 810 fixed to the inside of a housing 820. The tubular magnet 810 may be formed from a number of discrete pieces or a single piece magnet may be used. A tubular bobbin 840 is positioned inside the tubular magnet 810 and secured to the housing of the geophone by means of centering springs 830a and 830b. The springs 830a and 830b allow the bobbin 840 to move freely in the axial direction but hold it relatively securely in the radial direction. The springs 830a and 830b may be circular springs, or other springs where appropriate. A coil 850 is wound around the outer surface of the bobbin 840 and so is likewise moveable relative to the magnet 810. A pole piece 855 is provided inside the tubular bobbin 840. Two damper mechanisms 860a and 860b are mounted on the top end cap 821a and bottom end cap 821b, respectively. The two damper mechanisms 860a and 860b have similar structures and only damper mechanism 860a is described further here.

The damper mechanism 860a includes a solenoid portion 861a, a shaft portion 862a, and a damper plate 863a. The damper plate 863a is located on the inside surface of the end cap 821a. The damper mechanism 860a has the same longitudinal axis as that of the bobbin 840. The damper plate 863a may be of a round and flat shape with a diameter slightly larger than the outside diameter of the bobbin 840. When the geophone is in an OFF status, the solenoid is turned off and the shaft 862a pushes the damper plate 863a against the top end of the bobbin 840. The damper mechanism 860b functions in a similar way. Thus, the coil assembly is locked and prevented from moving longitudinally, as shown in FIG. 8A. When the geophone is in operation, the solenoid is turned on and the damper plates are retracted away from the ends of the bobbin and thus release the coil assembly as shown in FIG. 8B.

Figure 9B:
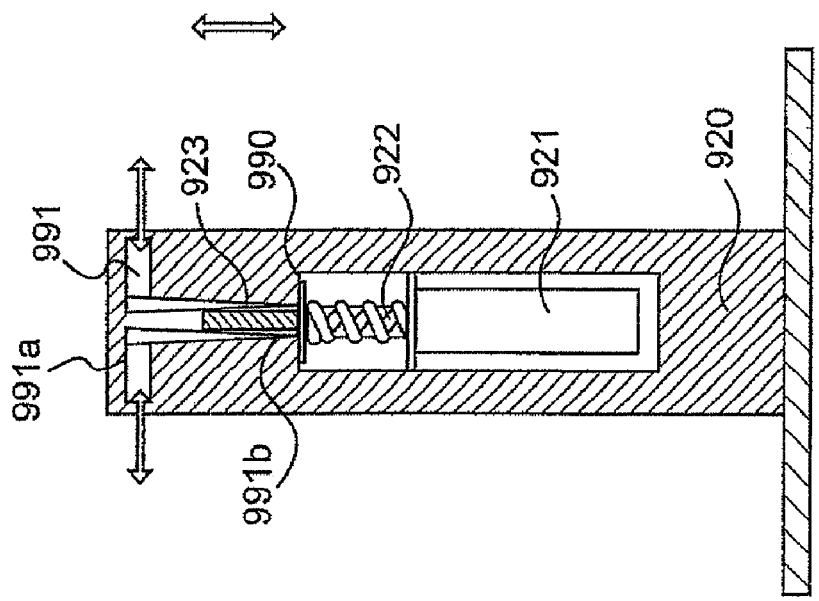
FIGS. 9A and 9B show a schematic view of a geophone according to yet another embodiment disclosed herein.
Figure 9A:
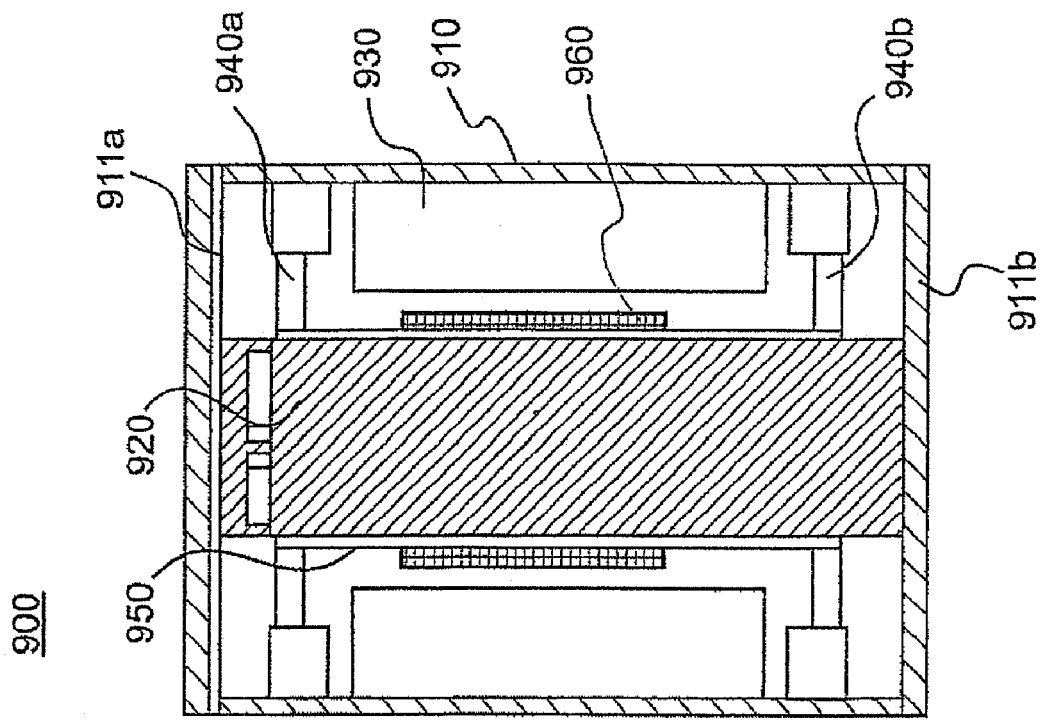

FIGS. 9A and 9B illustrate a geophone 900 according to another embodiment of the present disclosure. The geophone 900 comprises a housing 910, a cylindrical center pole piece 920 mounted between the top end cap 911a and the bottom end cap 911b of the geophone 900. A tubular magnet 930 is fixed to the inside of the housing 910. A tubular bobbin 950 is positioned around the pole piece 920 and secured to the housing 910 of the geophone by means of springs 940a and 940b. The springs allow the bobbin 950 to translate in the axial direction relative to the magnet. A coil 960 is wound around the outer surface of the bobbin 950 and so is likewise moveable relative to the magnet 930.

A locking mechanism 990 may be located inside the pole piece 920. As shown in FIG. 9B, the locking mechanism 990 comprises a solenoid 921 including a spring 922 and a tapered portion 923 extending from the plunger of the solenoid 921 (not shown). The locking mechanism 990 further comprises two or more locking pins 991, each of which has a head end 991a and a tail end 991b. The locking pins 991 may be arranged in such a way that the tail ends 991b of the locking pins have a constant contact with the tapered portion 923. When the solenoid 921 is deactivated, the spring 922 turns from a compressed state to an uncompressed state, and the upward movement of the plunger of the solenoid 921 causes the tapered portion 923 to apply force to the locking pins 991 to push the locking pins outwardly. Thus, the locking pin heads 991a will be pushed outside the pole piece 920 and the pin heads will contact one or both the springs to hold down the springs 940a and 940b, and thus hold down the whole coil assembly.

FIGS. 10A and 10B illustrate a three-component geophone 1000 according to one embodiment of the present disclosure. The three geophones 1020, 1040 and 1060 are mounted in a housing 1010. The three geophones 1020, 1040 and 1060 have similar structures and only geophone 1020 will be described here as an example. The geophone 1020 includes two annular torus shaped bladders 1022a and 1022b formed on the inner surface of two end caps 1024a and 1024b around the pole piece of the geophone such that when inflated, the two bladders 1022a and 1022b will abut against the springs 1028a and 1028b, respectively. The bladders may be formed by rubber, plastic or metal. Two fluid passages 1026a and 1026b are formed inside the two end caps 1024a and 1024b to connect to the two bladders 1022a and 1022b, respectively.

The three-component geophone 1000 further comprises a fluid supply assembly 1006, which may include a piston 1008 and a spring. A groove 1012a is formed in the housing 1010. The fluid supply assembly 1006 may be formed outside the three-component geophone 1000 and connect to the groove 1012a through a hole 1014. When the fluid supply assembly 1006 is ON, the piston 1008 is pushed downward and the fluid enters the housing 1010 of the three-component geophone. Because the fluid inside the geophones has pressure, the fluid inflates the bladders through each fluid passage of the geophones. FIG. 10B is a sectional-view of the three-component geophone taken along section lines 10B-10B in FIG. 10A.

It will be seen in FIGS. 10A and 10B that grooves 1012a and 1012b extend longitudinally and radially via channels 1012c and 1012d within housing 1010 such that each bladder on each end of the three geophones is simultaneously connected to the fluid system by channels within the interior of the closed housing 1010 and thus the housing itself functions as a fluid line.

FIG. 11 shows a cross-sectional view of a geophone 1100 according to another embodiment herein. Only one portion of the geophone is shown in this figure. The geophone 1100 includes an annular-shaped moving coil holder 1120, which has a protrusion edge 1122 formed along its peripheral edge. The protrusion edge 1122 is formed in a tapered way which is thicker at the bottom and thinner at the top. The moving coil 1130 may be configured to include an edge 1132 corresponding to the protrusion edge 1122 of the moving coil holder such that when the bladder 1110 is inflated, the protrusion edge 1122 will abut against the edge 1132 of the moving coil 1130. Thus, the moving coil 1130 can be locked securely in position and is prevented from moving axially and radially.

FIGS. 12A and 12B illustrate a diaphragm 1200, which may be used to form a bladder, according to another embodiment of the present disclosure. FIG. 12A shows a top view of the diaphragm. FIG. 12B shows a cross-sectional view of the diaphragm. The diaphragm 1200 may be annular-shaped and have corrugation 1210 formed on its edge. The diaphragm may be made of rubber, metal or plastic.

FIGS. 13A, 13B and 13C show a diaphragm 1300, which has a similar structure as the diaphragm depicted in FIGS. 12A and 12B, except that a plurality of protrusions 1310 may be formed on the surface of the diaphragm 1300. The protrusions may be of a triangular-shape as shown in FIG. 13B, or a sphere-shape, as shown in FIG. 13C.

FIG. 14 shows a cross-sectional view of a geophone according to yet another embodiment. The geophone may include bladders made of diaphragm 1410, which has a similar structure as the diaphragm depicted in FIG. 13. The geophone also includes a frame 1420 for holding a moving coil 1430 with a bobbin 1440. A plurality of cavities 1422 formed on the frame 1420 have a shape corresponding to the protrusions 1412 such that when the diaphragm 1410 is inflated, the protrusions 1412 will be inserted into the cavities 1422. Thus, the moving coil 1430 will be prevented from moving axially, radially, and rotationally.

FIGS. 15A and 15B illustrate a geophone 1500 according to another embodiment of the present disclosure. FIG. 15A shows a cross-sectional view of the geophone 1500 having a moving coil 1560 and a bobbin 1580 with a spring 1540 attached thereto. Only one portion of the geophone is shown. The end cap 1510 has four holes 1512 formed thereon. An annular disk 1520 is mounted on the inner surface of the end cap 1510 by a spring 1522. The spring 1522 has one end connected to the end cap 1510 and the other end connected to the disk 1520 as shown in FIG. 15A. Four pistons 1524 are connected to the annular disk 1520 through the four holes 1512. While drilling, low pressure is kept inside the geophone. When external pressure increases to a certain degree, the disk 1520 will be pushed by the spring 1522 to abut against the moving coil spring 1540 of the geophone due to the pressure difference. By reducing the external pressure, the disk is retracted due to the pressure difference and releases the moving coil 1560 of the geophone 1500. Alternatively, fluid lines or exterior housing channels may be connected to the base of each piston 1524. In another embodiment, the pistons 1524 may be connected to an electrical motor, which may be used to drive the pistons 1524 to push against the disk 1520.

FIG. 16 illustrates a geophone 1600 according to another embodiment herein. FIG. 16A shows a cross-sectional view of the geophone 1600. The geophone 1600 has a similar structure as the geophone depicted in FIGS. 15A and 15B, except that a bellows 1610 is used in geophone 1600. FIG. 16B shows a cross-sectional view of the bellows 1610.

FIGS. 17A, 17B and 17C illustrate a geophone 1700 according to another embodiment. FIG. 17A shows a cross-sectional view of the geophone 1700. The geophone 1700 includes an arm 1710 formed on an annular disk 1720 and extends outside the geophone housing 1730 through a hole 1732 formed on the housing 1730. By screwing the annular disk 1720, the disk may lock the moving coil 1740 of the geophone 1700. For example, the arm 1710 may be connected to a suitable spring to move the arm 1710 (as depicted in FIG. 17C) and turn the disk 1720 to lock against the moving coil 1740 of the geophone 1700. A suitable actuator may be employed to pull the arm 1710 against the spring force to release the moving coil 1740 of the geophone 1700 during seismic measurements. In this, any suitable fluidic, mechanical, electromagnetic, or piezoelectric actuator may be employed for purposes of the locking mechanism depicted in FIGS. 17A to 17C. For example, a solenoid (not shown) may be used to provide active force to the arm 1710 and the annular disk 1720 against the force of the spring (note FIG. 17C).

Although certain activation mechanisms have been described above, other mechanisms may also be used. In this, the locking devices described herein may be activated by electro-magnetic and/or piezoelectric actuators. Such additional activation mechanisms may be designed and configured according to the principles described above. For example, the rotatable locking disc of FIGS. 17A-17C may be activated by one or more of fluidic, electro-magnetic, and piezoelectric action. As used herein, the expression fluid is intended to have its broad meaning and includes gases such as air, nitrogen or other gas compositions as well as liquids such as oil, water, alcohol, hydraulic fluid and other liquids. Where expressions have multiple meanings it is intended that the expression used is intended to be inclusive and have the broadest meaning unless there is a specific limitation noted.

The various aspects of the invention were chosen and described in order to best explain the principles of the invention and its practical application. The preceding description is intended to enable those of skill in the art to best utilize the invention in various embodiments and aspects and with modifications as are suited to the particular use contemplated. It is intended that the scope of the invention be defined by the following claims.

What is claimed is:

1. A seismic sensor comprising:
    a housing;
    at least one magnet mounted within said housing;
    a coil assembly mounted within said housing;
    at least one spring assembly connected to said housing and said coil assembly for supporting said coil assembly for transduction within said magnet; and
    a locking mechanism for preventing said coil assembly from moving when the sensor is in an OFF status, wherein the locking mechanism is configured for activation by fluidic action.

2. A seismic sensor as defined in claim 1, wherein said fluid activated locking mechanism comprises: at least one fluid bladder and a fluid source assembly.

3. A seismic sensor as defined in claim 1, wherein said housing is configured for positioning within a borehole.

4. A seismic sensor as defined in claim 1, wherein said housing is configured for positioning at the surface.

5. A seismic sensor as defined in claim 1, wherein said locking mechanism comprises: a rotatable locking disc.

6. A geophone for detecting seismic events in a downhole logging while drilling environment, said geophone comprising: a housing operable to be positioned within a borehole;
   at least one permanent magnet for creating a magnetic field mounted within said housing;
   a coil assembly mounted within said housing;
   at least one spring assembly connected to said housing and said coil assembly for supporting said coil assembly for transduction within said magnetic field; and
   a fluid activated locking mechanism for preventing said coil assembly from moving when the geophone is in an OFF status.

7. A geophone for detecting seismic events in a downhole logging while drilling environment as defined in claim 6, wherein said fluid locking mechanism comprises: at least one damper plate operable to abut said coil assembly.

8. A geophone for detecting seismic events in a downhole logging while drilling environment, said geophone comprising:
   a housing having a first end cap and a second end cap operable to be positioned within a borehole;
   a pole piece connected to said first end cap and said second end cap;
   at least one permanent magnet for creating a magnetic field mounted within said housing;
   a coil assembly mounted within said housing;
   at least one spring assembly connected to said housing and said coil assembly for supporting said coil assembly for transduction within said magnetic field; and
   a locking mechanism for locking said coil assembly relative to the housing when said geophone is in an OFF status.

9. A geophone for detecting seismic events in a downhole logging while drilling environment as defined in claim 8, wherein the locking mechanism is configured for activation by one or more of fluidic, electro-magnetic and piezoelectric action.

10. A geophone for detecting seismic events in a downhole logging while drilling environment as defined in claim 8, wherein said locking mechanism is located inside said pole piece and said locking mechanism comprises: a solenoid.

11. A three-component geophone for detecting seismic events in a downhole logging while drilling environment, comprising:
    a first geophone, a second geophone, and a third geophone oriented along three mutually orthogonal axes;
    a housing containing said first geophone, said second geophone, and said third geophone;
    wherein each of said first geophone, said second geophone and said third geophone comprises:
    a housing;
    at least one permanent magnet for creating a magnetic field mounted within said housing;
    a coil assembly mounted within said housing;
    at least one spring assembly connected to said housing and said coil assembly for supporting said coil assembly for transduction within said magnetic field; and
    a locking mechanism for locking said coil assembly relative to the housing when the sensor is in an OFF status.

12. A three-component geophone for detecting seismic events in a downhole logging while drilling environment, comprising:
    a first geophone, a second geophone, and a third geophone oriented along three mutually orthogonal axes;
    a housing containing said first geophone, said second geophone, and said third geophone;
    wherein each of said first geophone, said second geophone and said third geophone comprises:
    a housing;
    at least one permanent magnet for creating a magnetic field mounted within said housing;
    a coil assembly mounted within said housing;
    at least one spring assembly connected to said housing and said coil assembly for supporting said coil assembly for transduction within said magnetic field;
    a locking mechanism for preventing said coil assembly from moving when the sensor is in an OFF status, wherein said locking mechanism is configured for activation by fluidic action, said fluid activated locking mechanism comprising:
    a fluid source assembly connected to said housing containing said first geophone, said second geophone and said third geophone; and
    wherein said fluid activated locking mechanism further comprises at least one fluid bladder.

13. A three-component geophone for detecting seismic events in a downhole logging while drilling environment as defined in claim 12, wherein said fluid activated locking mechanism further comprises: at least one locking disc actuated by said fluid bladder.

14. A three-component geophone for detecting seismic events in a downhole logging while drilling environment as defined in claim 12, wherein said fluid activated locking mechanism comprises: at least one diaphragm with a corrugated surface.

15. A three-component geophone for detecting seismic events in a downhole logging while drilling environment as defined in claim 12, wherein said fluid activated locking mechanism comprises: at least one bellows.

16. A three-component geophone for detecting seismic events in a downhole logging while drilling environment as defined in claim 12, wherein said fluid activated locking mechanism comprises: a liquid.

17. A three-component geophone for detecting seismic events in a downhole logging while drilling environment as defined in claim 12, wherein said fluid activated locking mechanism comprises: a gas.

18. A three-component geophone for detecting seismic events in a downhole logging while drilling environment, comprising:
    a first geophone, a second geophone, and a third geophone oriented along three mutually orthogonal axis;
    a housing containing said first geophone, said second geophone, and said third geophone; and
    a fluid source assembly including a piston assembly and being connected by fluid lines to said first geophone, said second geophone and said third geophone,
    wherein each of said first geophone, said second geophone and said third geophone comprises:
    a housing having a first end cap and a second end cap operable to be positioned within a borehole;
    at least one permanent magnet for creating a magnetic field mounted within said housing;
    a coil assembly mounted within said housing;
    at least one spring assembly connected to said housing and said coil assembly for supporting said coil assembly for transduction within said magnetic field; and a locking mechanism for preventing said coil assembly from moving longitudinally when said geophone is in an OFF status wherein the locking mechanism is configured for activation by the fluid source assembly.

* * * * *